W. T. Nichols,

Road Scraper.

No. 109,440. Patented Nov. 22, 1870.

Witnesses.
R. T. Campbell
J. N. Campbell

Inventor
W. T. Nichols
by
Mason, Fenwick & Lawrence
Attys

United States Patent Office.

WILLIAM T. NICHOLS, OF CHICAGO, ILLINOIS, ASSIGNOR TO HIMSELF AND H. H. LAWRENCE, OF SAME PLACE.

Letters Patent No. 109,440, dated November 22, 1870.

IMPROVEMENT IN ROAD-SCRAPERS.

The Schedule referred to in these Letters Patent and making part of the same.

*To all whom it may concern:*

Be it known that I, WILLIAM T. NICHOLS, of Chicago, in the county of Cook and State of Illinois, have invented a new and improved Road-Scraper; and I do hereby declare that the following is a full, clear, and exact description thereof, reference being had to the accompanying drawing making part of this specification, in which—

Similar letters of reference indicate corresponding parts in the several figures.

Figure 1:
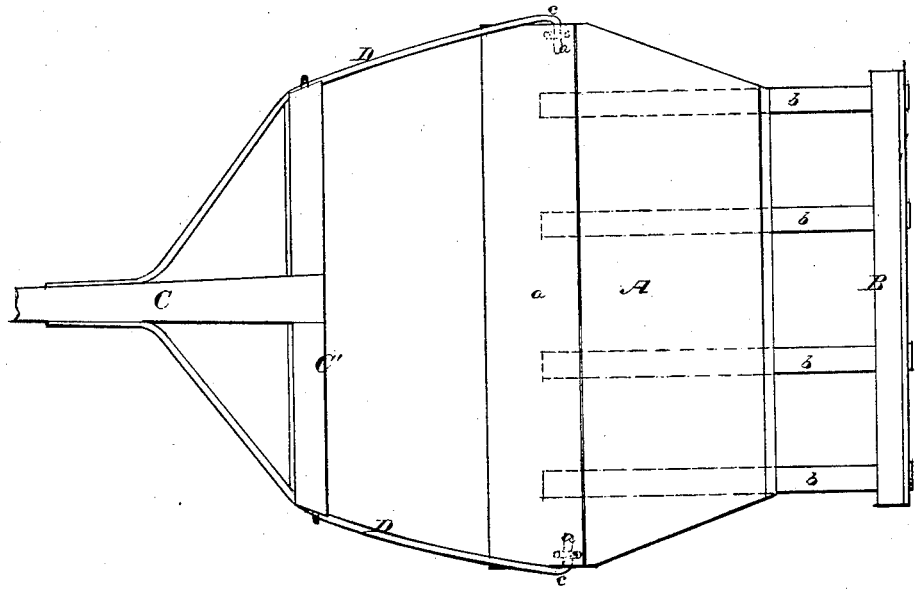
Figure 1 is a top view of the improved scraper.

This invention relates to an improvement on scrapers for clearing and leveling roads, which are adapted for being drawn by animals, and guided and controlled by persons walking behind them.

The object of my invention is to hinge or pivot a scraper, hereinafter described, to bails, which are applied to a draft-pole, and which are spread apart and stiffened by means of a cross-bar secured to the rear end of the draft-pole, as will be hereinafter explained.

The following description will enable others skilled in the art to understand my invention:

In the accompanying drawing—

A represents the bed of the scraper, which is a board of suitable width and length, shod on its scraping edge with a metal plate, *a*.

The front and rear edges of the scraping bed are parallel to each other, and the ends are sloped off backward.

This bed is strengthened by means of ribs *b b b b* secured to its bottom side, and tapered at their front ends to correspond with the bevel of the scraping edge of the bed.

The rear ends of the ribs *b b b b* are extended out in rear of the back edge of the bed A, and have secured transversely across them a bar, B, which serves as the handle by which a person can control the scraper while it is being drawn along.

To the back side of the scraper-bed A, near its ends and a little in rear of its scraping edge, staples *g* are inserted, which receive the hooked ends *c* of pole-rods D D.

These pole-rods constitute a draft-bail, and are secured to the draft-pole C as follows:

The front ends of the rods D D are secured fast to the sides of the pole C; the rods are then extended backward and outward through notches made into the extremities of a cross-bar, C', which is secured to the rear end of the pole, as shown in the drawing.

Figure 2:
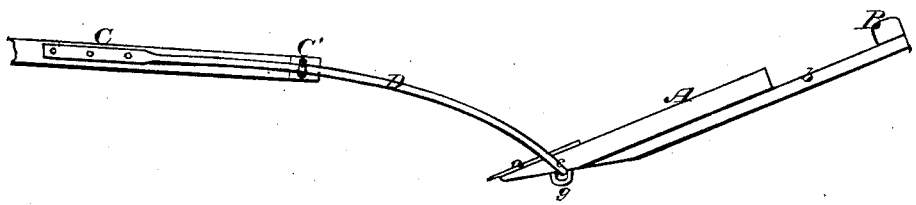
Figure 2 is a view of one side of the scraper.

From the ends of cross-bar C' to the hooks *c c* the rods D D spread outwardly and are bowed, as shown in fig. 2.

The cross-bar C' serves as a brace for the draft-bail, and the front portions of the bail-rods serve as a brace for the cross-bar.

The advantages of the scraper are—

First, that it is lighter, cheaper, and easier handled than any other.

Second, that, being attached to a draft-pole, it is much more easily worked with the team than being doubling up or getting over the traces.

Third, the draft from the ends and rear give it more power to cut in hard soil for this reason. When it is depressed almost to a level the draft is practically transferred to the very edge, and one man can hold it in that position in the hardest ground against the power of ten horses.

I am now using these scrapers in my own work, and find that they do double the work of any scraper I have yet used.

I am aware of the scrapers patented to Thos. Penrose, June 27, 1854, and H. A. Maybee, May 26, 1868, and therefore do not claim anything shown in these patents; but, as in neither of these patents nor in any scraper having a bail pivoted as I show have a brace and tongue been combined with the bail, I do claim as my invention and desire to secure by Letters Patent—

1. The arrangement of the bail D, fastening *c g*, brace C', tongue C, and scraper *a* A B, substantially in the manner described.

2. The combination of the tongue C, brace C', bail D, and scraper A *a* B, substantially in the manner described.

3. The bail D, braced at C', and attached to the tongue C, and made flexible between its brace C' and its hooked ends *c c*, in combination with the road-scraper, in the manner shown and described.

WILLIAM T. NICHOLS.

Witnesses:
J. P. WILLARD,
HENRY A. PEARSONS.